United States Patent
Haslinger et al.

(10) Patent No.: US 10,508,564 B2
(45) Date of Patent: Dec. 17, 2019

(54) BEARING HOUSING AND AN EXHAUST GAS TURBOCHARGER WITH SUCH A HOUSING

(71) Applicant: Bosch Mahle Turbo Systems GmbH & Co. KG, Stuttgart (DE)

(72) Inventors: Fabian Haslinger, Mannheim (DE); Simon Henzler, Frickenhausen (DE); Ruediger Kleinschmidt, Besigheim (DE); Oliver Kuhne, Stuttgart (DE); Steffen Schmitt, Ditzingen (DE); Frieder Stetter, Stuttgart (DE)

(73) Assignee: BMTS TECHNOLOGY GMBH & CO. (DE)

( * ) Notice: Subject to any disclaimer, the term of this patent is extended or adjusted under 35 U.S.C. 154(b) by 116 days.

(21) Appl. No.: 15/899,357

(22) Filed: Feb. 19, 2018

(65) Prior Publication Data
US 2018/0238191 A1    Aug. 23, 2018

(30) Foreign Application Priority Data
Feb. 20, 2017   (DE) ..................... 10 2017 202 687

(51) Int. Cl.
*F01D 25/16*   (2006.01)
*F01D 25/18*   (2006.01)
(Continued)

(52) U.S. Cl.
CPC ......... *F01D 25/166* (2013.01); *F01D 25/168* (2013.01); *F01D 25/186* (2013.01);
(Continued)

(58) Field of Classification Search
None
See application file for complete search history.

(56) References Cited

U.S. PATENT DOCUMENTS

| | | | | |
|---|---|---|---|---|
| 4,609,334 A | * | 9/1986 | Muir | F01C 1/0215 |
| | | | | 418/150 |
| 4,664,605 A | * | 5/1987 | Asano | F01D 25/183 |
| | | | | 417/407 |

(Continued)

FOREIGN PATENT DOCUMENTS

| | | | |
|---|---|---|---|
| DE | 102010003796 A1 | 10/2011 | |
| DE | 102010025614 A1 * | 1/2012 | ............ F01D 25/16 |

(Continued)

OTHER PUBLICATIONS

English abstract for DE-102015119602.
English abstract for JP-H07-217441.

*Primary Examiner* — Michael Lebentritt
(74) *Attorney, Agent, or Firm* — Fishman Stewart PLLC

(57) ABSTRACT

A bearing housing for an exhaust gas turbocharger may include a bearing housing cover arranged on a bearing housing wall. The bearing housing cover may include a penetrating rotation-symmetrical sealing recess with a centre axis and may have a locating surface facing the bearing housing wall and radially extending from the centre axis. The bearing housing may include a sealing bush arranged in at least one region of the sealing recess. The sealing bush may have a stop surface arranged opposite the locating surface and may include a penetrating shaft recess disposed rotation-symmetrical relative to the centre axis. The bearing housing cover may further include an at least partly circulating groove disposed on the locating surface radially spaced from the centre axis. The groove may include a drainage region arranged below the centre axis and extending from the centre axis radially to an outside.

20 Claims, 4 Drawing Sheets

(51) Int. Cl.
*F16C 33/74* (2006.01)
*F16C 35/04* (2006.01)
*F01M 11/02* (2006.01)
*F02C 6/12* (2006.01)

(52) U.S. Cl.
CPC .......... *F16C 33/743* (2013.01); *F16C 35/042* (2013.01); *F01D 25/18* (2013.01); *F01M 2011/021* (2013.01); *F02C 6/12* (2013.01); *F05D 2220/40* (2013.01); *F05D 2240/50* (2013.01); *F05D 2240/52* (2013.01); *F05D 2240/70* (2013.01); *F05D 2260/602* (2013.01); *F05D 2260/6022* (2013.01); *F16C 2360/24* (2013.01); *F16N 2210/14* (2013.01)

(56) References Cited

U.S. PATENT DOCUMENTS

| | | |
|---|---|---|
| 8,398,363 B2 | 3/2013 | Mundinger et al. |
| 9,169,738 B2 | 10/2015 | Schlienger et al. |
| 2007/0044470 A1* | 3/2007 | Sumser .................. F02B 37/04 60/599 |
| 2007/0092387 A1* | 4/2007 | Ward ...................... F04D 25/04 417/407 |
| 2011/0223010 A1* | 9/2011 | Mundinger ............. F01D 25/16 415/170.1 |
| 2013/0183144 A1* | 7/2013 | Schenkenberger ... F01D 25/162 415/170.1 |
| 2014/0234075 A1* | 8/2014 | Weber .................... F01D 25/186 415/112 |
| 2015/0086144 A1* | 3/2015 | Moscetti ............. F16C 33/1085 384/282 |
| 2015/0125263 A1* | 5/2015 | Grabowska ............ F16J 15/164 415/104 |
| 2015/0337847 A1* | 11/2015 | Koch ...................... F01D 25/16 417/407 |
| 2016/0201727 A1* | 7/2016 | Wild ..................... F01D 25/162 415/229 |
| 2018/0135698 A1* | 5/2018 | Toyota .................... F16C 33/76 |

FOREIGN PATENT DOCUMENTS

| | | | |
|---|---|---|---|
| DE | 102015119602 A1 | 5/2017 | |
| EP | 2192272 A1 | 6/2010 | |
| EP | 2511543 A1 | 10/2012 | |
| JP | H07-217441 A | 8/1995 | |
| WO | 2010060827 A1 | 6/2010 | |
| WO | 2016153963 A1 | 9/2016 | |

* cited by examiner

BEARING HOUSING AND AN EXHAUST GAS TURBOCHARGER WITH SUCH A HOUSING

CROSS-REFERENCE TO RELATED APPLICATIONS

This application claims priority to German Patent Application No. DE 10 2017 202 687.1, filed on Feb. 20, 2017, the contents of which are hereby incorporated by reference in its entirety.

TECHNICAL FIELD

The invention relates to a bearing housing with a bearing housing cover and an exhaust gas turbocharger with such a bearing housing.

BACKGROUND

In an exhaust gas turbocharger, the bearing housing connects a compressor housing for compressing the air flowing to combustion chambers of the combustion cylinder with a turbine housing for driving a shaft by means of an exhaust gas flow. The bearing housing, the compressor housing and the turbine housing are connected to one another by the shaft. The turbine housing and the compressor housing are charged with a particle flow and have to be separated from the lubricating oil accommodating bearing housing in an oil-tight manner.

The bearing housing is separated from the compressor housing by the bearing housing cover. In order for the shaft to be able to connect the bearing housing with the compressor housing, the bearing housing cover has a rotation-symmetrical seal recess with a centre axis. In the seal recess, a sealing bush is arranged at least in regions, which sealing bush comprises a shaft recess for the shaft and seals the same relative to the compressor housing. The sealing bush is arranged on a locating surface of the bearing housing cover with a stop surface and is thereby axially fixed in the direction of the compressor housing. On the locating surface of the bearing housing cover, a circumferential groove that is spaced from the centre axis is additionally arranged.

At high rotational speeds, an overpressure is present in the compressor housing compared with the bearing housing so that the lubricating oil cannot escape from the bearing housing into the compressor housing. However, when the rotational speed and thus the pressure in the compressor housing drops, the lubricating oil can escape into the compressor housing, in particular between the locating surface of the bearing housing and the stop surface of the sealing bush.

From the prior art, some solutions for an oil-tight separation of the bearing housing from the compressor housing are already known. Accordingly, the publications JP 721 441 A and U.S. Pat. No. 4,664,605 A for example describe additional sealing washers by way of which the lubricating oil is already caught before the bearing housing cover and conducted back into an interior space of the bearing housing. However, if the lubricating oil enters between the sealing washer and the bearing housing cover the lubricating oil can no longer be caught.

The publication EP 2 192 272 B1 describes a further solution to the problem described above.

SUMMARY

The object of the present invention is to improve a bearing housing of the type mentioned above in such a manner that in particular the seal is improved in a sealing region between the locating surface of the bearing housing and the stop surface of the sealing bush.

According to the invention, this object is solved through the subject of the independent claim(s). Advantageous embodiments are subject of the dependent claims.

The present invention is based on the general idea that a groove comprises a drainage region arranged below a centre axis which is extended outward radially from the centre axis. The groove can for example be egg shaped or, in the extended drainage region, tapers downwards in a point. The extended drainage region can advantageously reduce an annular flow in the groove and the lubricating oil can drain out of the groove under the effect of gravity through the drainage region. Thus, the quantity of the lubricating oil in the groove and consequently on the locating surface of the bearing housing is reduced and the sealing region between the bearing housing cover and the sealing bush better sealed.

In an advantageous further development of the solution according to the invention it is provided that the groove comprises at least one outflow duct that is directed radially to the outside and arranged below the centre axis. The outflow duct connects the groove and the locating surface of the bearing housing cover below the centre axis so that the lubricating oil can more quickly drain out of the groove.

The outflow duct can have a form that is adapted to the flow of the lubricating oil in the groove. Accordingly, the outflow duct in its longitudinal direction can have a deviating width, a deviating depth and/or a deviating cross section. By way of the geometry of the outflow duct, the drainage speed and the drainage quantity of the lubricating oil can be optimised.

Advantageously it is provided that the bearing housing cover comprises at least one drainage recess arranged below the centre axis and lying against an outer sidewall of the groove. The drainage recess can have a smaller depth compared with the groove so that the lubricating oil accumulated in the groove can drain under the force of gravity into the drainage recess and subsequently onto the locating surface of the bearing housing cover. The drainage recess is not arranged circumferentially about the centre axis so that no annular flow is possible in the drainage recess and because of this a greater quantity of the lubricating oil can drain.

The bearing housing cover can also comprise a plurality of drainage recesses lying against one another, wherein the drainage recesses can have a depth, width and length that deviate from one another. The depth, the width and the length of the drainage recesses can change step by step so that through the drainage recesses a step-like drainage structure is formed. Such a step-like drainage structure can prevent the annular flow in the groove so that the drainage of the lubricating oil from the groove can be improved and the sealing region between the locating surface and the stop surface sealed.

Advantageously it is provided in a further development of the solution according to the invention that a bias angle between the outer sidewall of the groove and/or an inner sidewall of the groove and the centre axis deviates from zero. Because of this, the lubricating oil in the groove is drained from the centre axis and thus from the sealing region so that the quantity of the lubricating oil in the groove is reduced.

The inner sidewall of the groove that is inclined towards the centre axis diminishes a drainage of the lubricating oil to the sealing region and thus improves the seal between the locating surface and the stop surface. The oil that is accumulated in the groove is diverted by way of the outer sidewall of the groove that is inclined towards the centre axis. Advantageously, with an outer sidewall configured in such a manner the draining of the lubricating oil is supported also through the annular flow of the lubricating oil in the groove.

Both the bias angle between the centre axis and the inner sidewall as well as the bias angle between the centre axis and the outer sidewall can be adapted to the flow behaviour of the lubricating oil and differ from one another.

Advantageously it is provided that a sealing contour and a counter-sealing contour are provided on the stop surface which in particular engage into one another, wherein the sealing contour and the counter-sealing contour are arranged rotation-symmetrically and both spaced from the centre axis. Advantageously, the sealing contour for example can be a recess and the counter-sealing contour a protrusion that is formed in particular complementarily thereto. The contours prevent an additional drainage of the lubricating oil into the sealing region between the stop surface and the locating surface and improve the sealing in the sealing region.

With an alternative solution according to the invention it is provided that the groove comprises a separating web arranged below the centre axis, which interrupts the groove. The separating web prevents the annular flow of the lubricating oil in the groove so that the lubricating oil can drain out of the groove. The form of the separating web can be adapted to the flow behaviour of the lubricating oil in the groove. Accordingly, the separating web can be formed for example tapering towards the bottom in order to support a drainage of the lubricating oil under the effect of the gravity.

Advantageously, it is provided with a further development of the solution according to the invention that the groove comprises at least one outflow duct that is directed radially to the outside and arranged below the centre axis, through which outflow duct the lubricating oil accumulated in the groove can drain. Accordingly, the annular flow of the lubricating oil in the groove can be interrupted by the separating web and the lubricating oil accumulated on the separating web be discharged out of the groove through the outflow duct. The outflow duct can be arranged for example laterally of the separating web. Alternatively, two outflow ducts each can also be arranged laterally on the separating web.

The outflow duct can have a shape that is adapted to the flow behaviour of the lubricating oil in the groove. Accordingly, the outflow duct in its longitudinal direction can have a deviating width, a deviating depth or a deviating cross section. Through the geometry of the outflow duct, the drainage speed and the drainage quantity of the lubricating oil can be optimised.

Advantageously it is provided that the bearing housing cover comprises at least one drainage recess arranged below the centre axis and lying against an outer sidewall of the groove. The drainage recess can have a depth that is smaller compared with the groove so that the lubricating oil accumulated in the groove can drain under the force of gravity into the drainage recess and subsequently onto the locating surface of the bearing housing cover. The bearing housing cover can also comprise a plurality of drainage recesses lying against one another, wherein the drainage recesses have a depth, width and length that deviate from one another. Here, the separating web can project into the drainage recesses so that the annular flow of the lubricating oil is interrupted also in the respective drainage recess.

In an advantageous further development of the solution according to the invention it is provided that a bias angle between the outer sidewall of the groove and/or an inner sidewall of the groove and the centre axis deviates from zero. The lubricating oil in the groove can thus be discharged from the centre axis so that the sealing region can be better sealed. The bias angle between the centre axis and the inner sidewall can differ from the bias angle between the centre axis and the outer sidewall in order to be able to optimise the flow behaviour of the lubricating oil in the groove.

Advantageously it is provided that a sealing contour on the locating surface and a counter-sealing contour on the stop surface are provided, wherein the sealing contour and the counter-sealing contour are both arranged rotation-symmetrically and both spaced from the centre axis. For example, the sealing contour can be a recess and the counter-sealing contour a protrusion which in particular engages therein.

The invention relates to an exhaust gas turbocharger with a bearing housing according to the preceding description.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawing and are explained in more detail in the following description, wherein same reference characters relate to same or similar or functionally same components.

BRIEF DESCRIPTION OF THE DRAWINGS

It shows, in each case schematically

DETAILED DESCRIPTION

Figure 1:
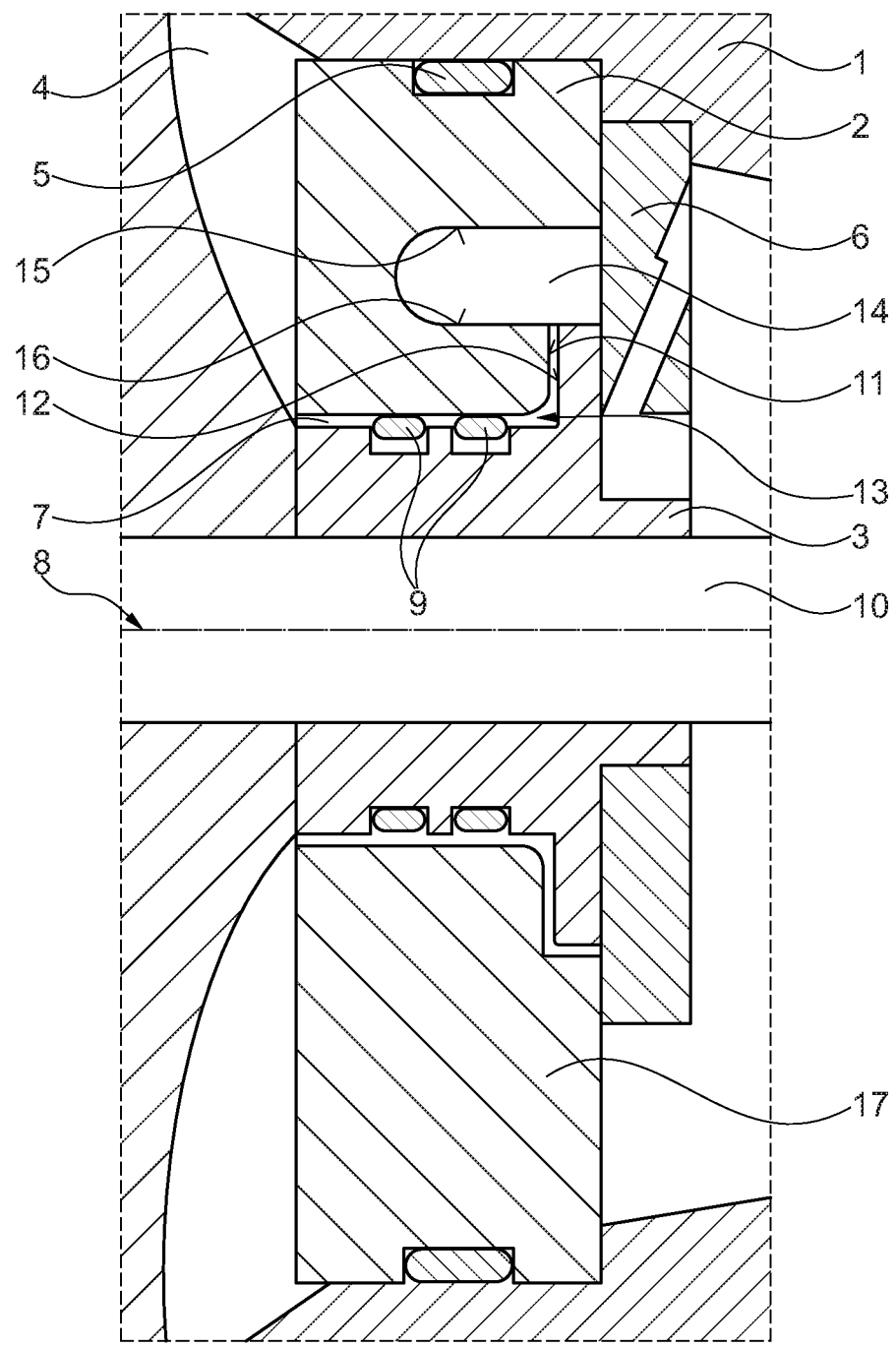
FIG. 1 a sectional view of a bearing housing with a bearing housing cover and with a sealing bush.

FIG. 1 shows a sectional view of a bearing housing 1 with a bearing housing cover 2 and with a sealing bush 3. By way of the bearing housing cover 2, the bearing housing 1 is separated from a compressor 4. Between the bearing housing cover 2 and the bearing housing 1 an annular seal 5 and an axial bearing disc 6 are arranged, each of which comprises on both sides a contact surface and a positioning recess for a shaft.

By way of a rotation-symmetrical sealing recess 7 with a centre axis 8, the shaft can connect the bearing housing 1 with the compressor 4. In the sealing recess 7, the sealing bush 3 is arranged in regions and is sealed through annular seals 9 relative to the bearing housing cover 2. The sealing bush 3 comprises a shaft recess 10 for the shaft and seals the bearing housing 1 relative to the compressor 4.

The sealing bush 3 is arranged with a stop surface 12 located opposite to a locating surface 11 of the bearing housing cover 2. Between the locating surface 11 and the stop surface 12 is located an annular gap and a sealing region 13, through which in particular at low rotational speeds the lubricating oil can enter the compressor 4.

Furthermore, on the locating surface 11 of the bearing housing cover 2 a groove 14 is arranged, which runs around the centre axis 8 in a spaced manner. The groove 14 comprises an outer sidewall 15 and an inner sidewall 16, wherein a bias angle of the outer sidewall 15 relative to the centre axis 8 and a bias angle of the inner sidewall 16 relative to the centre axis 8 in this exemplary embodiment is equal to zero, i.e. the walls 15, 16 are parallel to the centre axis 8.

Below the centre axis 8, the groove 14 comprises a separating web 17 which interrupts the groove 14. Through the separating web 15, an annular flow of the lubricating oil in the groove 14 can be interrupted and the lubricating oil can, laterally on the separating web 17, drain out of the groove 14.

Figure 2:
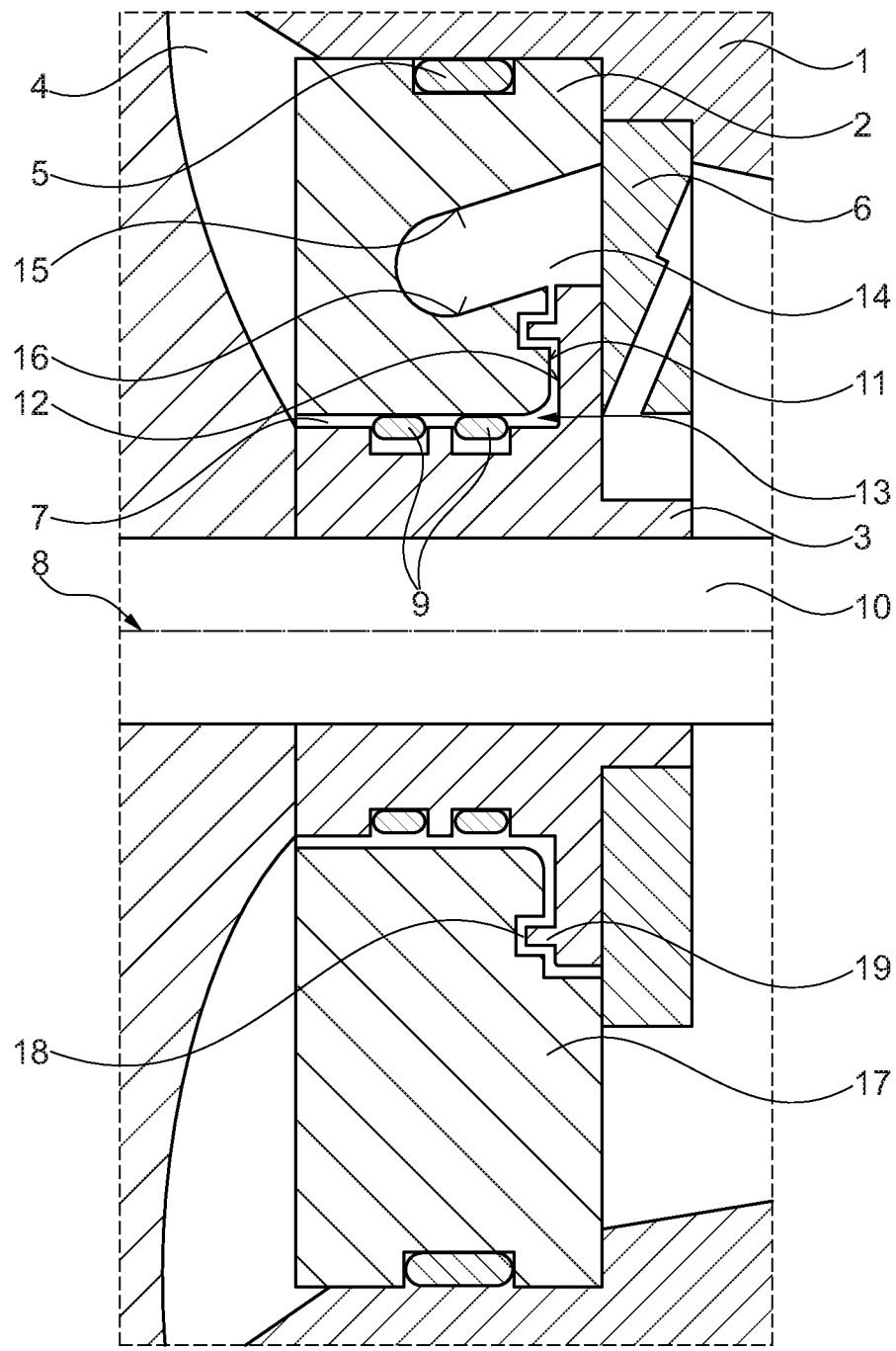
FIG. 2 a sectional view of a bearing housing, wherein a bearing housing cover and a sealing bush engage one behind the other.

FIG. 2 shows a sectional view of the bearing housing 1, wherein the bearing housing cover 2 and the sealing bush 3 engage behind one another. On the locating surface 11, the bearing housing cover 2 comprises a sealing contour in the form of a recess 18 and the sealing bush 3 on the stop surface 12 a sealing contour in the form of a protrusion 19. Both the recess 18 and also the protrusion 19 are rotation-symmetrical to the centre axis 8 so that a rotation of the sealing bush 3 with the shaft becomes possible.

In this exemplary embodiment, the bias angle of the outer sidewall 15 of the groove 14 and the inner sidewall 16 of the groove 14 relative to the centre axis 8 becomes unequal to zero. The lubricating oil in the groove 4 is drained from the sealing region 13 on the outer sidewall 15 and on the inner sidewall 16, so that the quantity of the lubricating oil in the sealing region 13 is reduced and because of this the sealing region 13 is better sealed.

Figure 3:
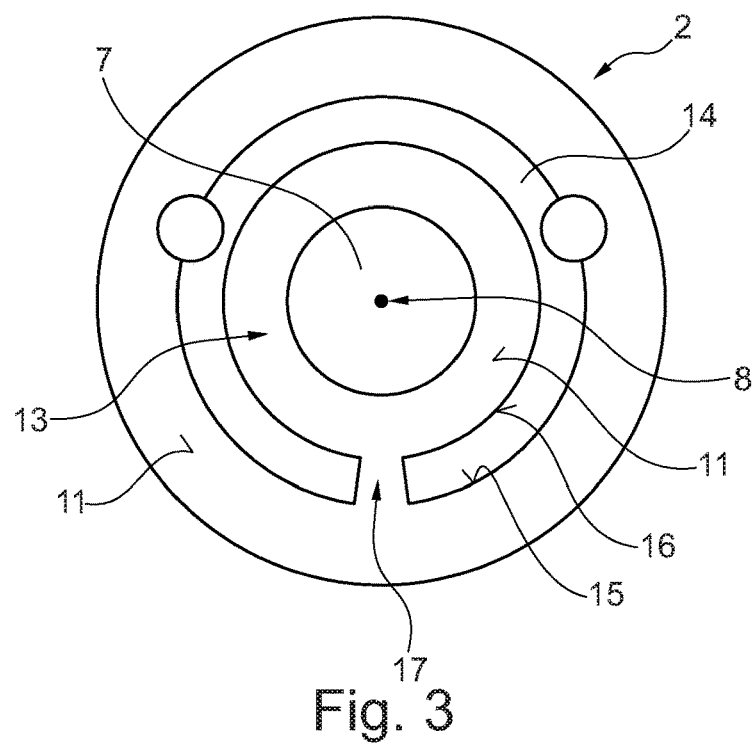
FIG. 3 a view of a bearing housing cover with a groove which is interrupted by a separating web.

FIG. 3 shows a view of the bearing housing cover 2 with the groove 14. In the groove 14, the separating web 17 is arranged, which interrupts the groove 14 below the centre axis 8. Through the separating web 17, an annular flow of the lubricating oil in the groove 14 is interrupted and the lubricating oil can drain out of the groove 14 laterally on the separating web 17.

Figure 4:
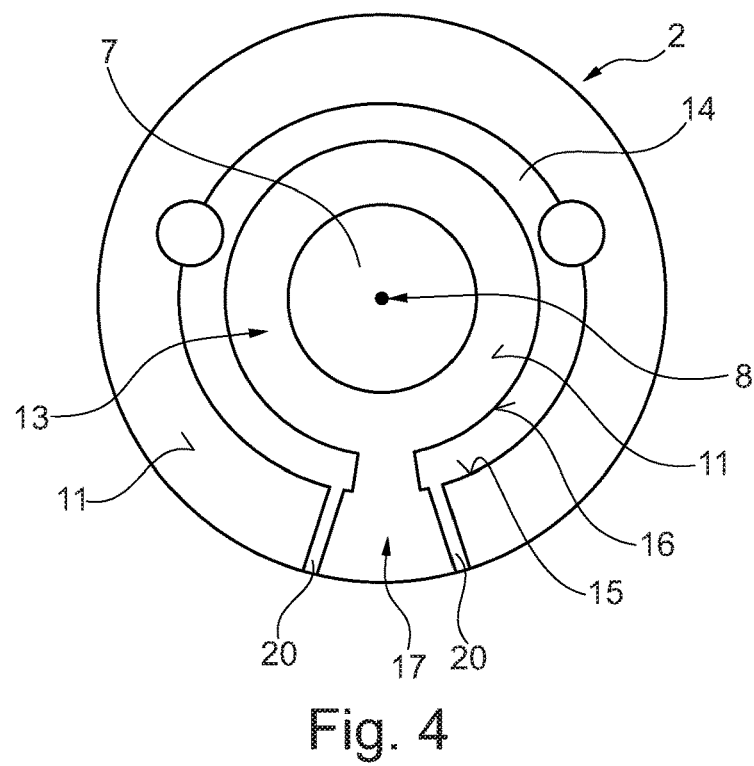
FIG. 4 a view of a bearing housing cover with a separating web and with outflow ducts.

In FIG. 4, a view of the bearing housing cover 2 with the separating web 17 and with outflow ducts 20 is shown. The outflow ducts 20 are directed to radially outside and are arranged below the centre axis 8. The outflow ducts 20 connect the groove 14 and the locating surface 11 of the bearing housing cover 2 so that the lubricating oil can more quickly drain out of the groove 14.

Figure 5:
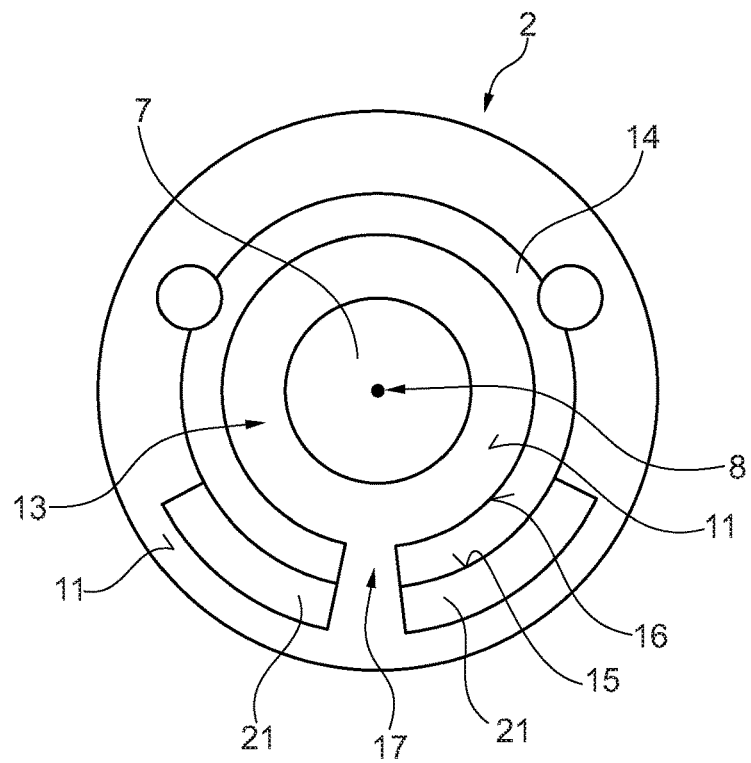
FIG. 5 a view of a bearing housing cover with a separating web and with a drainage recess.

FIG. 5 shows a view of the bearing housing cover 2 with the separating web 17 and with a drainage recess 21. The drainage recess 21 is arranged below the centre axis 8 and lies against the outer sidewall 15 of the groove 14. The drainage recess 21 has a smaller depth than the groove 14, so that the lubricating oil accumulated in the groove 14 can drain under the force of gravity into the drainage recess 21 and subsequently onto the locating surface 11 of the bearing housing cover 2. The drainage recess 21 about the centre axis 8 is not arranged circumferentially so that no annular flow in the drainage recess 21 is supported and because of this a greater quantity of the lubricating oil can drain.

Figure 6:
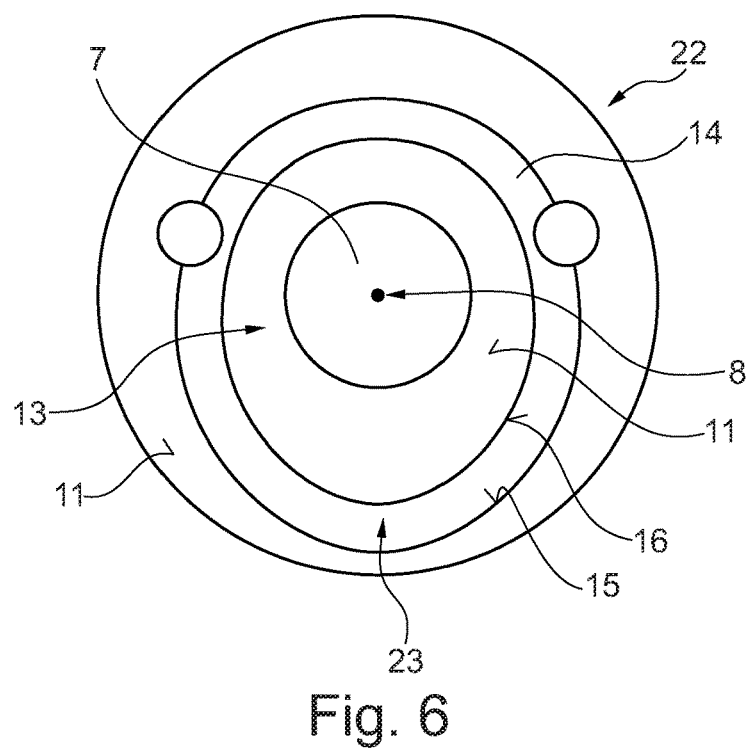
FIG. 6 a view of a bearing housing cover with a groove comprising a drainage region.

FIG. 6 shows a view of an alternatively configured bearing housing cover 22 with the groove 14 which comprises a drainage region 23. The drainage region 23 is arranged below the centre axis 8 and is extended from the centre axis 8 radially to the outside. The extended drainage region 23 can advantageously reduce an annular flow in the groove 14 and the lubricating oil can drain out of the groove 14 under the effect of the force of gravity. The quantity of the lubricating oil in the groove 14 and consequently on the locating surface 11 can thus be reduced and the sealing region 13 between the bearing housing cover 22 and the sealing bush 3 can be better sealed.

The invention claimed is:

1. A bearing housing for an exhaust gas turbocharger, comprising:
   a bearing housing cover arranged on a bearing housing wall;
   the bearing housing cover including a penetrating rotation-symmetrical sealing recess with a centre axis;
   a sealing bush arranged in at least one region of the sealing recess;
   the sealing bush including a penetrating shaft recess disposed rotation-symmetrical relative to the centre axis, the shaft recess configured to receive a shaft;
   the bearing housing cover having a locating surface facing the bearing housing wall and radially extending from the centre axis, the locating surface arranged opposite a stop surface of the sealing bush;
   the bearing housing cover further including an at least partly circulating groove disposed on the locating surface radially spaced from the centre axis;
   wherein the groove includes a drainage region arranged below the centre axis and extending from the centre axis radially to an outside such that the groove is one of egg shaped and tapers downwards to a point, the drainage region configured to allow lubricating oil accumulated in the groove to drain.

2. The bearing housing according to claim 1, wherein the groove further includes at least one outflow duct directed radially to the outside and arranged below the centre axis, through which the lubricating oil accumulated in the groove is drainable.

3. The bearing housing according to claim 1, wherein the bearing housing cover further includes at least one drainage recess arranged below the centre axis and abutting an outer sidewall of the groove.

4. The bearing housing according to claim 1, wherein a bias angle between the centre axis and at least one of i) an outer sidewall of the groove and ii an inner sidewall of the groove is greater than zero.

5. The bearing housing according to claim 1, wherein the locating surface includes a sealing contour and the stop surface includes a counter-sealing contour, the sealing contour and the counter-sealing contour arranged rotation-symmetrically and spaced from the centre axis.

6. The bearing housing according to claim 5, wherein the sealing contour is a recess and the counter-sealing contour is a protrusion complementary thereto.

7. A bearing housing for an exhaust gas turbocharger, comprising:
   a bearing housing cover arranged on a bearing housing wall;
   the bearing housing cover including a penetrating rotation-symmetrical sealing recess with a centre axis;
   a sealing bush arranged in at least one region of the sealing recess;
   the sealing bush including a penetrating shaft recess disposed rotation-symmetrical relative to the centre axis, the shaft recess configured to receive a shaft;

the bearing housing cover having a locating surface facing the bearing housing wall and extending radially from the centre axis, the locating surface arranged opposite a stop surface of the sealing bush;

the bearing housing cover further including a groove disposed on the locating surface radially spaced from the centre axis and extending at least partly circumferentially about the centre axis;

wherein the groove includes a separating web interrupting the groove and arranged below the centre axis.

8. The bearing housing according to claim 7, wherein the groove further includes at least one outflow duct directed radially to an outside and arranged below the centre axis, through which lubricating oil accumulated in the groove is drainable.

9. The bearing housing according to claim 7, wherein the bearing housing cover further includes at least one drainage recess arranged below the centre axis and abutting an outer sidewall of the groove.

10. The bearing housing according to claim 7, wherein a bias angle between the centre axis and at least one of i) an outer sidewall of the groove and ii) an inner sidewall of the groove is greater than zero.

11. The bearing housing according to claim 7, wherein the locating surface includes a sealing contour and the stop surface includes a counter-sealing contour, the sealing contour and the counter-sealing contour arranged rotation-symmetrically and spaced from the centre axis.

12. The bearing housing according to claim 11, wherein the sealing contour is a recess and the counter-sealing contour is a spring complementary thereto.

13. An exhaust gas turbocharger, comprising:
a bearing housing wall;
a bearing housing cover arranged on the bearing housing wall, the bearing housing cover including a penetrating rotation-symmetrical sealing recess with a centre axis and having a locating surface facing the bearing housing wall and radially extending from the centre axis;
a sealing bush arranged in at least one region of the sealing recess, the sealing bush having a stop surface arranged opposite the locating surface and including a penetrating shaft recess disposed rotation-symmetrical relative to the centre axis, the shaft recess configured to receive a shaft; and
an at least partly circulating groove disposed on the locating surface radially spaced from the centre axis, the groove including a drainage region arranged below the centre axis and extending from the centre axis radially to an outside such that the groove is one of i) egg shaped and ii) tapers downwards to a point;
wherein the drainage region is configured to allow lubricating oil accumulated in the groove to drain.

14. The bearing housing according to claim 13, wherein the groove further includes at least one outflow duct directed radially to the outside and arranged below the centre axis, through which the lubricating oil accumulated in the groove is drainable.

15. The bearing housing according to claim 13, wherein the bearing housing cover further includes at least one drainage recess arranged below the centre axis and abutting an outer sidewall of the groove.

16. The bearing housing according to claim 13, wherein a bias angle between the centre axis and at least one of i) an outer sidewall of the groove and ii) an inner sidewall of the groove is greater than zero.

17. The bearing housing according to claim 13, wherein the locating surface includes a sealing contour and the stop surface includes a counter-sealing contour, the sealing contour and the counter-sealing contour arranged rotation-symmetrically and spaced from the centre axis.

18. The bearing housing according to claim 17, wherein the sealing contour is a recess and the counter-sealing contour is a protrusion complementary thereto.

19. The bearing housing according to claim 3, wherein a bias angle between the centre axis and at least one of i) an outer sidewall of the groove and ii) an inner sidewall of the groove is greater than zero.

20. The bearing housing according to claim 3, wherein:
the locating surface includes a sealing contour structured as a recess;
the stop surface includes a counter-sealing contour structured as a protrusion complementary to the sealing contour; and
the sealing contour and the counter-sealing contour are arranged rotation-symmetrically and spaced from the centre axis.

* * * * *